Patented Sept. 9, 1952

2,610,213

UNITED STATES PATENT OFFICE 2,610,213

MANUFACTURE OF DDT

Norman E. Searle, Wilmington, Del., assignor to E. I. du Pont de Nemours & Company, Wilmington, Del., a corporation of Delaware No Drawing. Application November 29, 1945, Serial No. 631,795

2 Claims. (Cl. 260—649)

This invention relates to the manufacture of 2,2 - bis(p - chlorophenyl) -1,1,1-trichloroethane, commonly known as DDT, and is particularly directed to a process for effecting the condensation of chloral and mono-chlorobenzene while emulsified in aqueous sulfuric acid, the concentration of which is maintained throughout the condensation between about 95% and 98%.

It is known that chloral may be condensed with mono-chlorobenzene in the presence of sulfuric acid to give 2,2-bis(p-chlorophenyl)-1,1,1-trichloroethane (Ber. 5, 1098; Ber. 7, 1181; U. S. 1,707,181, and U. S. 2,329,074). In these prior art processes it has been proposed to use either "concentrated" sulfuric acid or 100% sulfuric acid. The "concentrated" sulfuric acid, however, was not a sufficiently active catalyst to effect any appreciable condensation at ordinary temperatures. Consequently, application of heat (Ber., supra) was required, which resulted in low yield and poor quality of product. According to my observations even at ordinary temperatures 100% sulfuric acid sulfonates mono-chlorobenzene at an extremely high rate. In fact, the sulfonation reaction greatly predominates over the condensation reaction thereby causing excessive loss of mono-chlorobenzene, excessive evolution of heat, dilution of catalyst, and difficulty in obtaining satisfactory dispersion. Although these disadvantages may have been of minor significance in the small scale laboratory preparations of the prior art, in the application of such processes to reaction batches involving tons of materials these adverse factors present such difficult problems of heat exchange, dispersion, material losses, product purification, and the like, as to entirely preclude economical or even feasible manufacture.

I have now found that the disadvantages of the prior art may be avoided and DDT obtained simply and economically by emulsifying chloral and mono-chlorozenzene in aqueous sulfuric acid of about 95% and not more than 98% strength and maintaining the sulfuric acid within this critical concentration range throughout the reaction.

By this means I am enabled to obtain spontaneous and exothermic condensation at ordinary temperatures and to suppress mono-chlorobenzene losses. I have found, moreover, that aqueous sulfuric acid below 98% concentration has relatively little sulfonating action on mono-chlorobenzene at ordinary temperatures as compared with sulfuric acid of higher strength or oleums. I have found also that sulfuric acid of about 95% and not more than 98% strength is an excellent emulsifying agent for mono-chlorobenzene and mono-chlorobenzene-chloral mixtures. The process of my invention takes advantage of these unexpected properties which mutually cooperate to produce a product of high purity and in high yield.

In carrying out the process of my invention, I prepare a liquid mixture containing chloral and mono-chlorobenzene and effect dispersion of this liquid in sulfuric acid of about 95% and not more than 98% strength, and during the course of the ensuing reaction maintain the acid phase (dispersion medium) within this critical concentration range. The emulsion so obtained is maintained in the dispersed state with agitation.

The reaction between chloral and mono-chlorobenzene as shown in the following equation

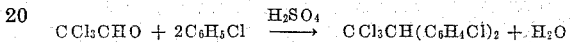

$$CCl_3CHO + 2C_6H_5Cl \xrightarrow{H_2SO_4} CCl_3CH(C_6H_4Cl)_2 + H_2O$$

is exothermic and in aqueous sulfuric acid of 95% to 98% concentration proceeds spontaneously until the water formed in the reaction dilutes the sulfuric acid to a strength below 95%. It is necessary, therefore, according to the invention, to prevent the water formed from excessively diluting the acid. This may be done by introducing sulfur trioxide as such or as oleum or as 98% to 100% sulfuric acid as required to maintain the desired strength, by starting the reaction initially in the presence of sufficient sulfuric acid of 98% strength that the water formed in the reaction does not dilute the acid below 95% strength, or by adding other suitable water-binding agents such as boron trifluoride.

According to a preferred embodiment of the invention, the organic phase of the reaction mixture, that is, the reactants together with the product and any organic solvent employed, is maintained emulsified in the acid phase throughout the reaction. By maintaining the organic phase liquid throughout the reaction, the emulsion state is preserved and significant advantages are obtained. For example, the reaction rate is sustained at a maximum by preservation of a high interfacial surface area between the acid catalyst and the reactant phase. Impairment of the favorable reaction rate, on the other hand, is avoided by elimination of imbibition of reactants by agglomerates of semi-solid reaction product. At the same time, provision of suitable agitation for large batches is greatly facilitated. The overall results are significant savings of time and power, improved quality, and increased yields.

The organic phase may be maintained in a liquid state throughout the reaction either by carrying out the reaction at an elevated temperature, viz., above the fusion point of the organic phase, or by including in the reaction mixture a sufficient amount of a solvent to prevent separation of a solid phase at ordinary temperatures. If the stoichiometric proportion of chloral and mono-chlorobenzene is employed, the product will appear during the reaction in the solid or semi-solid state. The maintenance of the product in liquid form solely by elevation of the temperature is undesirable because of increased sulfonation, decomposition of chloral, and other undesirable side reactions. It is of particular advantage, therefore, to effect the reaction in the presence of a solvent which will provide an easily emulsifiable liquid mixture containing the reactants. This solvent may be included initially in the reaction mixture or may be added as required to prevent precipitation of the solid phase. One or the other of the reagents may function as a solvent if used in excess and where that reagent may be easily sulfonated, as in the case of mono-chlorobenzene, it is advantageous to add the solvent only as required to maintain the organic phase liquid. In this manner the production of sulfonated by-products, mono-chlorobenzenesulfonic acid, for example, is minimized. Thus, in accordance with a preferred embodiment of the invention, I am enabled to obtain improved purity of product and improved yields by maintaining the reaction mass throughout the reaction in a state of emulsion, the dispersed phase of which consists of the reagents and product, preferably, together with a mutual solvent, and the continuous phase of which is the catalyst and vehicle, that is, the sulfuric acid of about 95% and not more than 98% strength.

In order to obtain optimum advantages in accordance with the invention, a critical regulation of the temperature must be maintained. If the temperature is allowed to rise unchecked as a result of the exothermic nature of the reaction, side reactions, such as sulfonation of the monochlorobenzene and the product, oxidation of the chloral, and degradation of the product become increasingly pronounced. The losses pyramid so rapidly with increased temperatures that it is not practical if high yields and high purity are desired to permit the temperature to rise above 40° C. during the reaction. Heat exchange, therefore, should be provided adequate to maintain the reaction temperature below 40° C. Any lower reactive temperature down to as low as —5° C. or less may be utilized advantageously to obtain improved purity and yields. Both appear to improve as the temperature is lowered. For practical operation, however, it is convenient to strike a balance between the value of the improved yields and high purity obtainable at the low temperatures and the expense of additional cooling capacity. Temperatures in the order of 10–30° C. consequently will ordinarily be found most suitable. Through the expedient of a solvent, as explained above, I am enabled to combine in a single process the advantages of effecting the condensation with the organic phase in an emulsified state throughout the reaction with the advantages of maintaining the temperature below 40° C.

The product of the condensation may be recovered from the reaction mixture in any suitable manner as, for example, by drowning the reaction mixture in water and filtering off the product. The processes of the invention, especially those in which a solvent is included, lend themselves especially well to separation by the method set out in my copending application, Serial No. 527,515, filed March 21, 1944, now Patent No. 2,464,265, dated March 15, 1949.

As already pointed out, it is difficult to recover a solid product from a sulfuric acid solution as is necessary where the reaction product is drowned in water. It is a distinct advantage, therefore, in my processes that they are ideally suited to separation by means of gravity separation. All that is necessary is that the two phases be allowed to separate under the influence of gravity, natural or induced (centrifuge), and to effect separation of the two phases by some form of decantation.

Some of the advantages of my preferred process, particularly with regard to separation of the product from the reaction mixture, are obtained even though a solid phase may separate during the reaction if at or near the end of the reaction the solid phase is liquefied either by raising the temperature of the reaction mixture or by including a suitable solvent, or by a combination of these steps. When the organic phase is thus liquefied it, too, may be separated from the acid phase simply by gravity separation.

The product obtained from the reaction mixture in any of these methods may be used as such, or it may be subjected to further purification to recover it from any unreacted or excess reagents or solvents with which is may be contaminated. For this purpose, any of the customary separating steps may be employed such as washing with selective solvents, recrystallization, or distillation. I prefer, however, to wash the liquid organic phase with water until it is neutral, including alkali in one or more of the washes if desired, and thereafter to subject the mixture to distillation under reduced pressure while maintaining the temperature such that the product remains liquid throughout. The mixture thus subjected to distillation will contain product, solvent and water, and under the conditions of the distillation the presence of water tends to aid in elimination of the solvent. This effect may be enhanced by introducing water into the still towards the end of the distillation either as such or as steam, or by sparging the reaction mixture with an inert gas. The former has the advantage, however, that the water vapor condenses in the condenser and thus makes it much easier to maintain a high degree of reduced pressure in the system. There is thus obtained a product in a fused state from which it may be solidified and worked up in any suitable manner.

The invention may be more fully understood by reference to the following examples in which the parts are by weight unless otherwise specified:

*Example 1*

To a mixture of 147.4 parts chloral and 338 parts mono-chlorobenzene there was added 990 parts of 98% sulfuric acid with agitation and with cooling such that the temperature over a period of 3 hours rose from 24.5° C. to 33° C. and after 4 hours and 40 minutes reached 37° C. There was then added 135 parts of water to raise the temperature and to break the emulsion. The water layer was drawn off at 75° C. and the product washed twice with 500 parts of water, and again with 500 parts of water containing about 0.3% ammonia, as NH₃, to pH 8. The product was washed twice more and subjected to vacuum distillation with a final temperature of 110° C. and a final pressure of 44 mm. mercury. There was distilled over 60 parts of mono-chlorobenzene and 56 parts of water, and there was recovered 302 parts of a colorless liquid which set at 87.1° C., giving a yield of 85% based on chloral.

It will be observed that in the washing of the product phase a substantial quantity of water (56 parts were recovered in the distillation) was incorporated. This may be accounted for by the water occluded or emulsified in the organic phase or by imperfect separation of the two phases. It may be separated from the mono-chlorobenzene distillate by gravity separation and the chlorobenzene so recovered recycled to the process.

It may be observed also that sulfonation of chlorobenzene takes place in the reaction, thus giving a lower yield based on mono-chlorobenzene (69%). The sulfonated product being water-soluble is separated during the washing so that build-up of sulfonates by recycling mono-chlorobenzene to the process is avoided.

In place of adding water to the reaction mixture to raise the temperature it may simply be heated or, alternatively, additional mono-chlorobenzene or other solvent may be added. When so liquefied the product phase may be separated from the aqueous acid phase simply by gravity separation.

*Example 2*

To a mixture of 270.2 parts mono-chlorobenzene and 147.4 parts of chloral there was added 400 parts of 98% sulfuric acid with agitation and cooling sufficient to maintain the temperature at about 25° C. This temperature was maintained for a period of 40 minutes after which there was started a gradual addition of 25% oleum. There was gradually and uniformly added 320 parts of 25% oleum over a period of one hour and forty-fixe minutes. After one hour and twenty-five minutes separation of crystals of product was observed and the oleum addition momentarily stopped to introduce an additional 110 parts of mono-chlorobenzene in order to dissolve the crystals. There is maintained throughout the entire course of the reaction sufficient agitation to obtain a good emulsion of the product phase in the aqueous sulfuric acid phase. The added mono-chlorobenzene is for the purpose of maintaining the desired emulsion. After completion of the oleum addition an additional 110 parts of mono-chlorobenzene was added to preserve the desired state of emulsion and the reaction was continued for approximately two hours and fifteen minutes at which time an additional 27.5 parts of mono-chlorobenzene was added and the temperature of the mixture raised to 45° C. to liquefy the product phase which was then separated from the aqueous acid phase by gravity separation.

The product phase was then washed four times with 400-part portions of warm water with the last portion containing 0.5% ammonia, as NH₃. After two more washings the product phase was subjected to vacuum distillation with a final temperature of 110° C. and a final pressure of 15 mm. mercury. There was distilled over 183 parts of mono-chlorobenzene and 18 parts of water. There was obtained 291 parts of a water-white liquid having a setting point of 89.2° C. and yield of 82% based on chloral.

*Example 3*

To a mixture of 540 parts of mono-chlorobenzene and 295 parts of chloral there was added 800 parts of 98% sulfuric acid with agitation and cooling sufficient to maintain the temperature at about 25° C. This temperature was maintained for a period of 30 minutes after which there was started a gradual addition of 20% oleum. There was gradually and uniformly added 837 parts of 20% oleum over a period of 3.6 hours and agitation and cooling was continued for an additional 3 hours while maintaining a temperature of 25° C. throughout. After 2¼ hours, separation of crystals of the product was observed and the oleum addition momentarily stopped to introduce an additional 200 parts of mono-chlorobenzene in order to dissolve the crystals. There is thus maintained throughout the entire course of the reaction sufficient agitation to obtain a good emulsion of the product phase in the aqueous sulfuric acid phase. The added mono-chlorobenzene is for the purpose of maintaining the desired emulsion. An additional 200 parts of mono-chlorobenzene was added about 40 minutes later to maintain the desired emulsion. The reaction mixture was then heated to 40° C. and allowed to settle for a period of one hour and the acid layer drawn off.

The product phase was then washed six times with 1000-part portions of warm water while maintaining the product phase at a temperature of 65° C. In the fifth and sixth washings there were included 1.44 cc. and 0.5 cc. per pound, of 28% ammonium hydroxide solution, respectively. The washed product was then subjected to vacuum distillation with a final temperature of 90° C. and a final pressure of 26 inches mercury gauge. During the distillation the temperature ranged from about 80 to about 95° C. and the pressure from 10 to 26 inches mercury gauge.

The final traces of mono-chlorobenzene may be removed by sparging the still residue with air or inert gases, or preferably by steam.

By the procedure of this example there was obtained 640 parts of a clear liquid having a setting point of 88.9° C. in yield of 90.1% based on chloral.

In the processes of Examples 2 and 3 the quantity of 98% sulfuric acid and quantity of oleum and rate of addition are regulated so as to give as nearly as possible the desired acid strength throughout the reaction. In these quantities there is taken into account the water formed in the interaction of the chloral and the mono-chlorobenzene, the water formed as a result of sulfonation reactions, and the loss of sulfuric acid resulting from sulfonation. Thus while the overall average concentration of the sulfuric acid is somewhat higher than 98% (about 99%), the actual concentration throughout the reaction is very closely maintained between about 95% and not more than 98%.

*Example 4*

A solution of 73.7 g. (0.5 mole) of chloral and 225.2 g. (2 moles) of chlorobenzene was slowly added with stirring to 500 g. of 95.5% sulfuric acid containing 55.5 g. (0.97 mole) of boron trifluoride. By ice-cooling the temperature was maintained at 5 to 14° C. during the first four hours and 23 minutes of reaction. Temperature was then allowed to rise gradually to 22° C. during the next 13½ hours without agitation. To dissolve crystals that had formed, 100 cc. of chlorobenzene was added and the temperature raised to 30° C. Separation and recovery of the product was effected as described in Example 2. The yield was 160.2 g. (90%) of clear, colorless liquid having a setting point of 91.8° C.

It is to be noted that under like conditions of temperature, time and proportion of reactants and catalyst, but without boron trifluoride, satisfactory condensation is not obtained. Likewise, boron trifluoride alone is ineffective in causing the desired reaction to take place. A similar experiment with boron trifluoride and 90% sulfuric acid gave only a poor yield of product. It therefore appears that the function of the boron trifluoride is to absorb water (forming $BF_3 \cdot 2H_2O$) and to maintain the concentration of the sulfuric acid within the optimum range.

While I have disclosed my invention with reference to particular examples, it is to be understood that it is not limited to any of the details thereof but that variation may be made without departing from the spirit and scope of the invention as long as the reagents are dispersed as liquid particles in sulfuric acid having a strength of about 95% and not greater than 98% strength and the strength of the sulfuric acid maintained throughout the reaction.

The stoichiometric proportions as indicated by the equation given above are one mole of chloral and two moles of mono-chlorobenzene. While the process may be effected easily and economically in these proportions and while the prior art has used these proportions apparently to facilitate recovery of a product free of mono-chlorobenzene, it is nonetheless undesirable to operate with stoichiometric proportions. Even when the reaction is closely controlled and the acid strength is limited carefully within the limits of about 95% strength and not greater than 98% strength, considerable sulfonation of mono-chlorobenzene results. It is accordingly desirable to have present initially or have added during the reaction such mono-chlorobenzene as may be required to compensate for any loss of mono-chlorobenzene by sulfonation. Additionally, it is desirable to have present an excess of mono-chlorobenzene, that is, chlorobenzene in excess of the quantity required for reacting with the chloral and sulfuric acid. This excess mono-chlorobenzene remains unreacted in the process and functions in several different ways to give improved results. It functions as a solvent for the product making it easier to liquefy the product preparatory to effecting mechanical separation of the product phase from the aqueous acid phase, and if incorporated in the reaction in sufficient amount will prevent any substantial separation of the product throughout the reaction. The amount of the excess may be varied considerably and as the amount of sulfonation is not a certain factor it will be ordinarily sufficient if the mono-chlorobenzene is present in proportions of at least about 2.2 moles for each mole of chloral and it will not ordinarily be necessary to have it present in excess of 5 moles for each mole of chloral.

It is desirable to introduce the excess mono-chlorobenzene periodically throughout the reaction as in this way sulfonation is minimized. Thus in the preferred operation the excess mono-chlorobenzene is present initially in an amount insufficient to keep the product from crystallizing out and is added in additional amounts as required practically to prevent this.

In place of using an excess of mono-chlorobenzene there may be substituted an appropriate quantity of any suitable solvent for the product, such as the usual hydrocarbon and chlorinated hydrocarbon solvents. Suitable solvents include carbon tetrachloride, ethylene dichloride, trichloroethylene, tetrachlorethane, perchloro ethylene, and mixed amyl chlorides. Mono-chlorobenzene is more desirable because the number of ingredients to be separated from the products are limited, the effect of mass action is obtained and the indeterminate sulfonation factor is automatically taken care of.

In place of chloral in the processes of the examples there may be substituted other compounds which yield chloral in the presence of sulfuric acid under the conditions of the process and which may be considered in effect as alternative ways of introducing chloral into the reaction mixture. Chloral hydrate, chloral alcoholate, and chloral acetal are such materials for the resulting reaction in each case appears to be the condensation between chloral and mono-chlorobenzene.

The amount of sulfuric acid required for carrying out the process depends upon the amount of water of formation liberated in the condensation reactions involved and the amount of water introduced from extraneous sources. To illustrate, if chloral is used the condensation with monochlorobenzene liberates one mole of water for each mole of chloral. Also, as sulfonation takes place one mole of water is liberated for each mole of mono-chlorobenzene sulfonated and at the same time the content of the sulfuric acid is reduced by one mole. Also, mono-chlorobenzene as recovered and recycled may introduce considerable water into the process. Those skilled in the art will be able to determine with a little experience the quantities of sulfuric acid required, bearing in mind that if the spent acid at any time during the process, that is, the acid which has become undesirably dilute, is fortified by sulfur trioxide either as such or in oleum, a lesser quantity of acid will be required.

If chloral hydrate is used in the process, allowance must be made for the additional mole of water liberated. Similarly, if chloral alcoholate is used in the process there will be an additional mole of water and also an additional mole of sulfuric acid used up in esterification.

If 98% sulfuric acid is used the amount required may be introduced altogether. Without taking into account sulfonation or carry-over of water by recycling mono-chlorobenzene, the theoretical quantities of 98% acid may be determined by the formula $$X = \frac{0.95y}{3}$$

where X equals the moles of acid required per mole of chloral or its equivalent and $y$ equals the grams of water liberated per mole of chloral or its equivalent. Thus one mole of chloral would require 5.7 moles of 98% acid (570 grams) and chloral hydrate would require twice that much (1140 grams). Chloral alcoholate would require an additional mole (100 grams) of 98% acid thus making a total of 1240 grams. These quantities may be augmented as required in view of sulfonation and water carry-over.

It is neither necessary nor desirable that all the sulfuric acid be added at one time and, in fact, the process may be started with any amount of sulfuric acid of strength between about 95% and 98% which will provide a workable volume of emulsion. Under such conditions the process will automatically take care of itself. Such quantities of mono-chlorobenzene and chloral as cannot be taken up in the emulsion will remain as a separate phase unless sufficient agitation is employed to effect dispersion of one phase in the other.

In place of using 98% acid to maintain the strength of the acid in the dispersion medium, it may be fortified by sulfur trioxide either as such or as oleum. The acid layer may be withdrawn and fortified or the oleum or sulfur trioxide introduced directly into the emulsion layer. The more care taken that the strong acid, that is, oleum or sulfur trioxide (liquid), does not come in direct contact with the organic layer by itself and that the acid in contact with the monochlorobenzene does not exceed 98% strength, the less sulfonation takes place. Thus in processes of the invention, in which the strength of the acid in contact with monochlorobenzene is always maintained at 98% strength or below, sulfonation is readily controlled and limited to a minimum commensurate with spontaneous condensation of the reagents.

When the acid concentration is maintained above at a certain strength the reaction proceeds spontaneously at ordinary temperatures, and even down to $-5°$ C. or less, without the application of heat. This concentration is critical at about 95% strength. When the acid strength is too low, the reaction does not proceed at a practical rate at tempertures below 40° C. The upper range of acid strength is critical at 98%. Above 98% strength the rate of sulfonation pyramids rapidly.

In the preferred operation of the process, the reaction should be effected under conditions of heat exchange suitable to dissipate the surplus heat of reaction and to prevent the temperature of the reaction mixture from becoming excessive. Ordinarily it is desirable to keep the reaction temperature below about 30° C. though higher temperatures up to about 40° C. may be used where loss of yield and degradations of the product are not consequential. At still higher temperatures objectionable reactions, such as excessive sulfonation of the product, dehydrohalogenation of the product, and oxidation of chloral are likely to take place. The temperature is therefore critical to good yields and purity of product within limits of a reactive temperature (0° C. or less) up to about 40° C.

This application is in part a continuation of my copending application, Serial No. 527,514, filed March 21, 1944, now abandoned.

While I have described my invention with reference to particular embodiments, it will be understood that it is not limited to the particular embodiments shown and that variation may be made therein within the spirit and scope of the invention.

I claim:

1. In the manufacture of DDT, the steps comprising condensing chloral and mono-chlorobenzene while a liquid mixture of the chloral and mono-chlorobenzene in the proportions of at least 2.2 moles of mono-chlorobenzene for each mole of chloral is emulsified in a sufficient amount of sulfuric acid of about 95% and not more than 98% strength to emulsify all of the mixture, effecting cooling as required to maintain the temperature from about 10° C. to about 40° C., adding oleum as required to maintain the sulfuric acid at this strength, and adding mono-chlorobenzene as required to prevent separation of the solid phase.

2. In the manufacture of DDT, the steps comprising condensing chloral and mono-chlorobenzene while a liquid mixture of the chloral and mono-chlorobenzene in the proportions to provide an amount of mono-chlorobenzene in excess of that required to react with all the chloral to form DDT is emulsified in sulfuric acid of about 95% and not more than 98% strength, introducing sulfur trioxide as required to maintain the sulfuric acid at this strength, introducing a further quantity of mono-chlorobenzene as required to prevent separation of the solid phase, and effecting cooling as required to keep the temperature of the reaction mixture below about 40° C.

NORMAN E. SEARLE.

REFERENCES CITED

The following references are of record in the file of this patent:

UNITED STATES PATENTS

| Number | Name | Date |
|---|---|---|
| 2,329,074 | Muller | Sept. 7, 1943 |
| 2,464,265 | Searle | Mar. 15, 1949 |

OTHER REFERENCES

Brandt et al., "Ber. der Deut. Chem. Gesell.," vol. 72, p. 1031 (1939).

Iris et al., "Rev. Inst. Salub. Enferm. Trop.," vol. 5, p. 73 (1944).